United States Patent
Haas et al.

(10) Patent No.: US 9,297,412 B2
(45) Date of Patent: Mar. 29, 2016

(54) BEARING ASSEMBLY

(71) Applicants: Roland Haas, Hofhelm (DE); Elke Huhn, Schweinfurt (DE); Marcel Gersting, Schweinfurt (DE); Volker Wendt, Üchtelhausen (DE); Peter Lemper, Hitzacker (DE)

(72) Inventors: Roland Haas, Hofhelm (DE); Elke Huhn, Schweinfurt (DE); Marcel Gersting, Schweinfurt (DE); Volker Wendt, Üchtelhausen (DE); Peter Lemper, Hitzacker (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/270,969

(22) Filed: May 6, 2014

(65) Prior Publication Data
US 2014/0355920 A1 Dec. 4, 2014

(30) Foreign Application Priority Data

Jul. 9, 2009 (DE) .......................... 10 2009 032 294

(51) Int. Cl.
*F16C 19/38* (2006.01)
*F16C 33/66* (2006.01)
*F16C 35/06* (2006.01)
(Continued)

(52) U.S. Cl.
CPC ............. *F16C 19/385* (2013.01); *F16C 19/386* (2013.01); *F16C 19/543* (2013.01); *F16C 25/08* (2013.01); *F16C 33/586* (2013.01); *F16C 33/6651* (2013.01); *F16C 33/6677* (2013.01); *F16C 35/042* (2013.01); *F16C 35/063* (2013.01); *F16C 35/073* (2013.01); *F16C 2226/60* (2013.01); *F16C 2229/00* (2013.01); *F16C 2361/61* (2013.01)

(58) Field of Classification Search
CPC .... F16C 19/385; F16C 19/386; F16C 35/042; F16C 25/08; F16C 33/6622; F16C 33/6677; F16C 2361/61; F16C 2226/60; F16C 2229/00; F16C 33/586; F16C 33/6651; F16C 19/543; F16C 35/073; F16C 35/063; F16H 57/082
USPC .......... 384/584, 585, 542, 462, 465, 473, 474, 384/475, 559, 561, 569, 571
See application file for complete search history.

(56) References Cited

U.S. PATENT DOCUMENTS 1,927,534 A * 9/1933 Wooler .......................... 384/474
2,405,745 A * 8/1946 Haager .......................... 384/584
(Continued)

FOREIGN PATENT DOCUMENTS

JP 63231021 A * 9/1988 .............. F16C 33/66
JP 2004360723 A 12/2004
(Continued)

*Primary Examiner* — Alan B Waits
(74) *Attorney, Agent, or Firm* — Bryan Peckjian; SKF USA Inc. Patent Dept.

(57) ABSTRACT

A bearing assembly includes at least one outer ring and an inner ring unit including first and second inner rings, the inner ring unit having a central, axial bore extending through the first and second inner rings, and a plurality of attachment bores for attaching the bearing assembly to a bearing carrier. A first plurality of roller bodies is disposed between the at least one outer ring and the first inner ring and a second plurality of roller bodies is disposed between the at least one outer ring and the second inner ring. A pin extends through the central axial bore of the first inner ring and through the central axial bore of the second inner ring, and the pin maintains a predetermined preload on the bearing assembly by holding the first inner ring in a fixed position relative to the second inner ring.

17 Claims, 5 Drawing Sheets

(51) Int. Cl.
   *F16C 35/063*   (2006.01)
   *F16C 35/073*   (2006.01)
   *F16C 25/08*    (2006.01)
   *F16C 35/04*    (2006.01)
   *F16C 19/54*    (2006.01)
   *F16C 33/58*    (2006.01)

(56) References Cited

U.S. PATENT DOCUMENTS

| | | | | |
|---|---|---|---|---|
| 2,666,676 | A * | 1/1954 | Rhine | 384/473 |
| 3,304,137 | A * | 2/1967 | Strassberg | 384/455 |
| 3,652,141 | A * | 3/1972 | Husten et al. | 384/455 |
| 3,730,600 | A | 5/1973 | Degnan | 384/626 |
| 3,802,755 | A * | 4/1974 | Schluter et al. | 384/455 |
| 3,819,243 | A * | 6/1974 | Asberg | 84/542 |
| 3,890,020 | A * | 6/1975 | Thomas | 384/559 |
| 4,124,256 | A * | 11/1978 | de Senneville | 384/455 |
| 4,150,468 | A * | 4/1979 | Harbottle | 29/898.09 |
| 4,422,697 | A * | 12/1983 | Gugel et al. | 384/452 |
| 4,586,832 | A * | 5/1986 | Oetjen | 384/455 |
| 4,730,946 | A * | 3/1988 | Cain | 384/506 |
| 4,764,153 | A * | 8/1988 | Jacob | 464/111 |
| 4,865,472 | A * | 9/1989 | Jacob | 384/503 |
| 4,878,769 | A * | 11/1989 | Schepp | 384/618 |
| 4,906,112 | A * | 3/1990 | Gobel et al. | 384/548 |
| 5,174,661 | A * | 12/1992 | Nicolas et al. | 384/538 |
| 5,362,159 | A * | 11/1994 | Kufner et al. | 384/484 |
| 5,593,235 | A * | 1/1997 | Gothberg et al. | 384/542 |
| 6,261,004 | B1 * | 7/2001 | Tsujimoto et al. | 384/571 |
| 6,312,161 | B1 * | 11/2001 | Williams | 384/459 |
| 6,357,921 | B1 * | 3/2002 | Dittenhofer | 384/455 |
| 6,543,938 | B2 * | 4/2003 | Dittenhofer | 384/455 |
| 6,770,007 | B2 * | 8/2004 | Fox | 475/348 |
| 6,994,651 | B2 * | 2/2006 | Fox et al. | 475/335 |
| 7,036,989 | B2 * | 5/2006 | Taki et al. | 384/475 |
| 7,084,522 | B2 * | 8/2006 | Wobben | 290/55 |
| 7,297,086 | B2 * | 11/2007 | Fox | 475/331 |
| 2003/0008748 | A1 * | 1/2003 | Fox | 475/346 |
| 2003/0012469 | A1 * | 1/2003 | Dittenhofer | 384/455 |
| 2003/0086631 | A1 * | 5/2003 | Faltus et al. | 384/559 |
| 2004/0108733 | A1 * | 6/2004 | Wobben | 290/55 |
| 2010/0215307 | A1 * | 8/2010 | Loeschner et al. | 384/571 |
| 2012/0040797 | A1 * | 2/2012 | Fox | 475/347 |
| 2012/0316027 | A1 * | 12/2012 | Erno et al. | 475/331 |
| 2014/0003946 | A1 * | 1/2014 | Moore et al. | 416/174 |
| 2014/0080658 | A1 * | 3/2014 | Edelmann et al. | 475/331 |
| 2014/0377069 | A1 * | 12/2014 | Minadeo | 416/135 |

FOREIGN PATENT DOCUMENTS

| | | |
|---|---|---|
| JP | 2005042894 A | 2/2005 |
| JP | 2006046380 A | 2/2006 |
| JP | 2006342920 A | 12/2006 |
| JP | 2008069808 A | 3/2008 |
| JP | 200732591 A | 8/2008 |

* cited by examiner

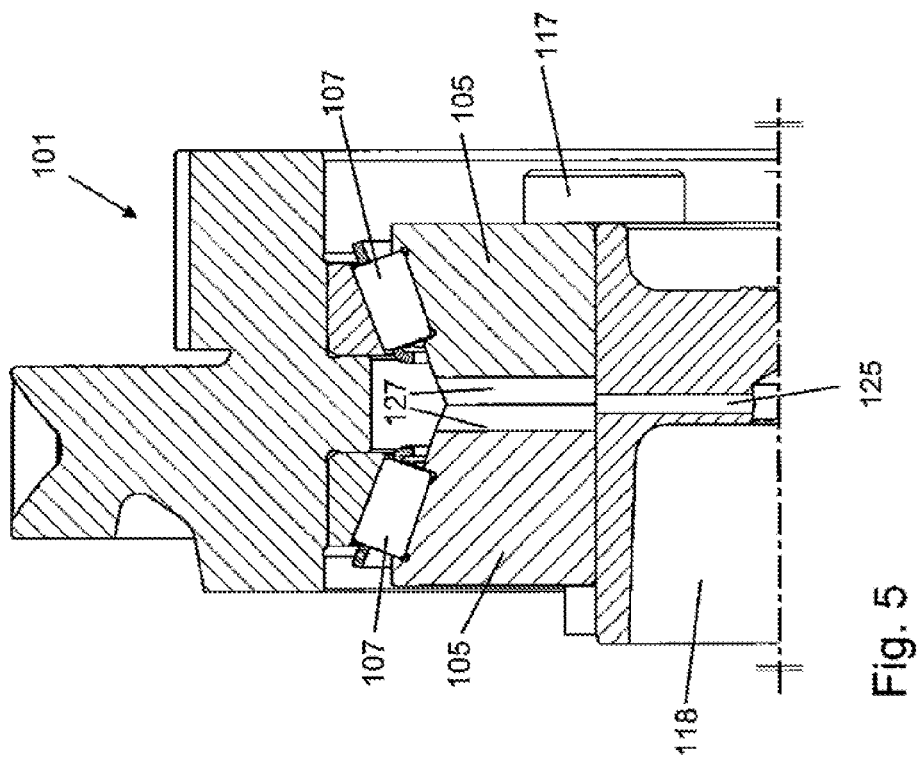
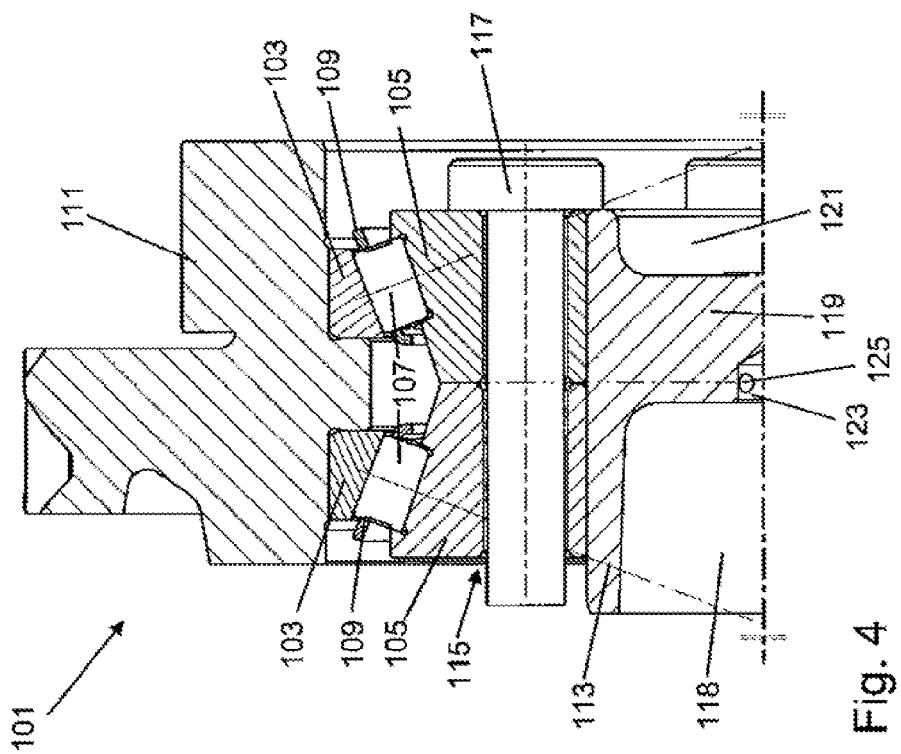

BEARING ASSEMBLY

CROSS-REFERENCE

This application is a continuation of U.S. patent application Ser. No. 12/833,439, filed Jul. 9, 2010, the contents of which are hereby incorporated by reference. U.S. Ser. No. 12/833,439 in turn claims priority to German patent application no. 10 2009 032 294.9, filed on Jul. 9, 2009.

TECHNICAL FIELD

The present invention relates to a bearing assembly comprising at least one outer ring and an inter ring unit having at least two inner rings, wherein roller bodies are rotatably disposed between the at least one outer ring and the inner rings.

BACKGROUND

Such a bearing assembly is utilized, e.g., as a two-row tapered roller bearing, in order to rotatably support a toothed gear wheel in an automobile engine. For example, the outer ring(s) of two tapered roller bearings are fitted in complementary mating surfaces of the toothed gear wheel. To attach the toothed gear wheel to an engine housing, the inner rings are retained, e.g., in a corresponding attachment unit, so that the toothed gear wheel is rotatably borne on the engine housing. The attachment unit has an axially-extending bore designed to receive a screw for threadably attaching the bearing assembly to the engine housing. Overall, known bearing assemblies of this type have been characterized by having a relatively complex construction and by requiring a time-consuming or expensive installation. In particular, it is relatively time-consuming and/or expensive to precisely set the required axial pre-loading or tensioning of the two inner rings of the tapered roller bearings against each other before the start of actual operation of the bearing assembly.

SUMMARY

It is an object of the present teachings to disclose improved bearing assemblies.

For example, in one aspect of the present teachings, bearing assemblies having a simplified construction are taught.

In another aspect of the present teachings, bearing assemblies having a lubricant conduit, e.g., one or more grooves, channels and/or bores, configured to supply lubricating oil, e.g., from an engine oil reservoir to the roller bodies are disclosed.

In another aspect of the present teachings, bearing assemblies having advantageous attachment arrangements for attaching the bearing assemblies to a bearing support or carrier, e.g., an engine housing, are taught.

In another aspect of the present teachings, a bearing assembly may include at least one outer ring and an inner ring unit including a first inner ring and a second inner ring. The inner ring unit has a central, axial bore extending through the first inner ring and the second inner ring and a plurality of attachment bores for attaching the bearing assembly to a bearing carrier. The plurality of attachment bores are spaced radially outward of the central axial bore and are located away from an axis of symmetry of the bearing assembly. A first plurality of roller bodies is rotatably disposed between the at least one outer ring and the first inner ring, and a second plurality of roller bodies is disposed between the at least one outer ring and the second inner ring. A pin extends through the central axial bore of the first inner ring and through the central axial bore of the second inner ring, and the pin maintains a predetermined preload on the bearing assembly by holding the first inner ring in a fixed position relative to the second inner ring.

In another aspect of the present teachings, a bearing assembly may include at least one outer ring and an inner ring unit including a first inner ring having a central, axial bore and a second inner ring having a central, axial bore. The assembly also includes a first plurality of roller bodies rotatably disposed between the at least one outer ring and the first inner ring and a second plurality of roller bodies rotatably disposed between the at least one outer ring and the second inner ring. A pin extends through the central axial bore of the first inner ring and through the central axial bore of the second inner ring and forms a friction fit with the central axial bore of the first inner ring and the central axial bore of the second inner ring and maintains a predetermined preload on the bearing assembly. A plurality axial attachment bores are located radially outwardly of the central axial bore of the first inner ring, and each of the plurality of axial attachment bores is configured to receive at least one attachment device for fixing the bearing assembly to a bearing carrier.

In another aspect of the present teachings, a bearing assembly may include at least one outer ring and an inner ring unit having at least two inner rings. A plurality of roller bodies are rotatably disposed between the at least one outer ring and the respective inner rings. A plurality of bores preferably extend through the inner ring unit, e.g., through the inner rings or through an axial supporting element for the inner rings, in the axial direction and each bore is shaped so as to accommodate or receive therein at least one attachment element, such as e.g., a bolt or screw. The attachment element preferably serves to affix the bearing assembly to or on a bearing carrier, such as e.g., an engine housing. The bores are preferably spaced from an axis of symmetry of the bearing assembly, more preferably they spaced from the axial symmetry axis. Each inner ring preferably also has an axially-extending central bore, in which a supporting element is disposed. The inner rings are axially supportable in a defined manner by the supporting element.

Relative to known bearing assemblies, such a bearing assembly has a noticeably simpler-to-handle structure. For example, the number of necessary components forming the bearing assembly may be reduced by providing the attachment bores within the inner ring unit or the axial supporting element of the bearing assembly.

In addition or in the alternative, the inner ring unit can have different constructions that are easily adaptable in accordance with particular design requirements. Optionally, the inner ring unit may be pre-assembled as a whole prior to mounting on the bearing carrier.

If the attachment bores are spaced from the axis of symmetry of the bearing assembly, the supporting element can extend through a central bore, which is aligned or collinear with the axis of symmetry, in order to axially support the inner rings against or relative to each other. Such a design may advantageously prevent or minimize the so-called "run down effect", which sometimes occurs in tapered roller bearings that must, prior to the start of operation, revolve a few times under a reduced axial pre-loading of the inner rings relative to each other in order to set the final, operational position of the tapered rollers. That is, the tapered rollers axially migrate towards an axially-outer rim during the initial revolutions, which is the preferred location of the tapered rollers during operation of the bearing assembly. Generally speaking, only in this position of the tapered rollers is a problem-free operation of the corresponding bearing assembly ensured. Therefore, during the pre-installation procedure for the two-row tapered roller bearing, it is often necessary to cause the bearing assembly to revolve, e.g., about 15 times at a reduced pre-loading of the inner rings. As soon as the respective tapered rollers have axially migrated and abut on the respective outer rims in their final position, the pre-loading or tensioning of the inner rings must then be increased and maintained, so that the position of the inner rings is fixed and the tapered rollers do not axially migrate together again when the bearing assembly enters into operation again after the final adjustment.

By disposing the supporting element, which may be a pin or a centering element, within the axially central bore, this pre-installation process can be performed more easily and reliably.

In addition or in the alternative to the above embodiments, at least one lubrication conduit may defined on or in at least one of the inner rings and is preferably configured to communicate liquid lubricant, e.g. oil, to the roller bodies. The at least one lubrication conduit is preferably a groove, a recess, a channel and/or a bore defined in or one at least one of the inner rings.

In another aspect of the present teachings, one or both of the inner rings may have a radially-extending chamfer at or on a radially-inward edge of the outer or side surface that faces the axially-adjacent inner ring. Preferably, the outer or side surface of at least one of the inner rings also has a groove that faces the axially-adjacent inner ring, which groove(s) extend(s) in the radial direction outwards from the chamfer(s) and is (are) formed such that lubricant located on the chamfer(s) is transportable radially-outward through the groove(s) defined between the inner rings. By appropriately designing the bearing assembly, it is possible, e.g., to bring or supply lubricant, e.g., oil, from the engine compartment to the chamfer(s), e.g., via the above-described central bore. The oil is then transported radially-outward via the chamfer(s) and the groove(s) connected thereto to the outer surface of at least one of the inner rings. The oil then moves between the two inner rings into a space, where the roller bodies are rotatably disposed. The oil can be distributed there and thus can lubricate the roller bodies during operation.

In another aspect of the present teachings, the groove is spiral-shaped, which can be produced in a simple manner when lathing the inner rings during the manufacturing process. For example, a lathe tool can be started at the chamfer and then drawn radially-outward while the inner ring makes, e.g., one revolution. In this case, a spiral-shaped groove results, through which the lubricant is transportable between the inner rings from the chamfer. In the alternative, the groove can have any other arbitrary shape. For example, the groove can extend radially-outward in a linear or otherwise curved manner from the inside surface of the inner rings.

In another aspect of the present teachings, the supporting element may have an at least partially hollow interior and at least one bore extending radially outward from the hollow interior. The bore(s) is (are) preferably designed such that lubricant is transportable therethrough from the hollow interior of the supporting element, e.g., to the chamfer(s) and/or groove(s) of the inner ring(s). If the bearing assembly is mounted, e.g., on an engine or an engine compartment of a motor vehicle, the hollow interior can be connected or in communication with the oil circulation system of the engine, so that lubricant from the engine is transportable through the radially-extending bore(s) to the groove(s) between the inner rings and ultimately to the roller bodies.

In addition or in the alternative, the supporting element may be configured to perform a centering function, e.g., the supporting element may serve to center the inner rings relative to the axial direction thereof.

In another aspect of the present teachings, at least one of the inner rings may have at least one additional groove or channel on or in its outer side surface that is opposite of the axially-adjacent inner ring. This additional groove is also preferably designed to transport lubricant through it to the central bore or to at least one of the attachment bores. Preferably, the inner ring(s) of this embodiment has (each have) a substantially axially-extending groove or channel on or in a radially-inner surface of the central bore. The substantially axially-extending groove or channel is preferably formed such that lubricant is transportable through it between the grooves and/or channels on or in the respective lateral outer side surfaces. If such a bearing assembly is mounted on an engine or an engine housing, oil can be transported from the engine to the outer-lying groove, then to the central bore, then to the chamfer(s) and then between the inner rings to the roller bodies, thereby ensuring an adequate or satisfactory lubrication of the roller bodies.

In another aspect of the present teachings, the bearing assembly may include at least one outer ring and an inner ring unit having at least two inner rings. Roller bodies are again rotatably disposed between the at least one outer ring and the inner rings. A plurality of axially-extending bores may be defined in the inner ring unit and each may be designed to accommodate or receive at least one attachment element, which is configured to affix the bearing assembly to a bearing carrier. The axially-extending bores are preferably spaced from an axis of symmetry of the bearing assembly, preferably from the axial symmetry axis. In such an embodiment, substantially the same advantages result that were already explained in the above-described bearing assemblies.

The inner ring unit again preferably includes a supporting element that is disposed within the inner rings, e.g., within a central bore thereof that is aligned with the axial symmetry axis. The inner rings can be axially supported in a defined manner by the supporting element. Further, the attachment bore(s) may optionally be defined in the supporting element, instead of in the inner rings.

In addition or in the alternative, a spacer may be disposed between the inner rings, thereby separating the inner rings in the axial direction. A clamping device, e.g., a tensioning disk, may also be provided. The spacer, the inner rings and the tensioning disk may be disposed such that an axial pre-loading of the inner rings, which is definable or settable by the tensioning disk, is achieved by the attachment element for the bearing assembly mounted on the bearing carrier.

Further advantages, features, objects and embodiments of the invention will be readily derivable from the exemplary embodiments described in the following in conjunction with the appended Figures.

BRIEF DESCRIPTION OF THE DRAWINGS

FIGS. 4 and 5 show two different cross-sectional illustrations of a second exemplary embodiment.

DETAILED DESCRIPTION

Each of the additional features and teachings disclosed below may be utilized separately or in conjunction with other features and teachings to provide improved bearings and/or bearing assemblies, as well as methods for designing, constructing and using the same. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

Figure 1:
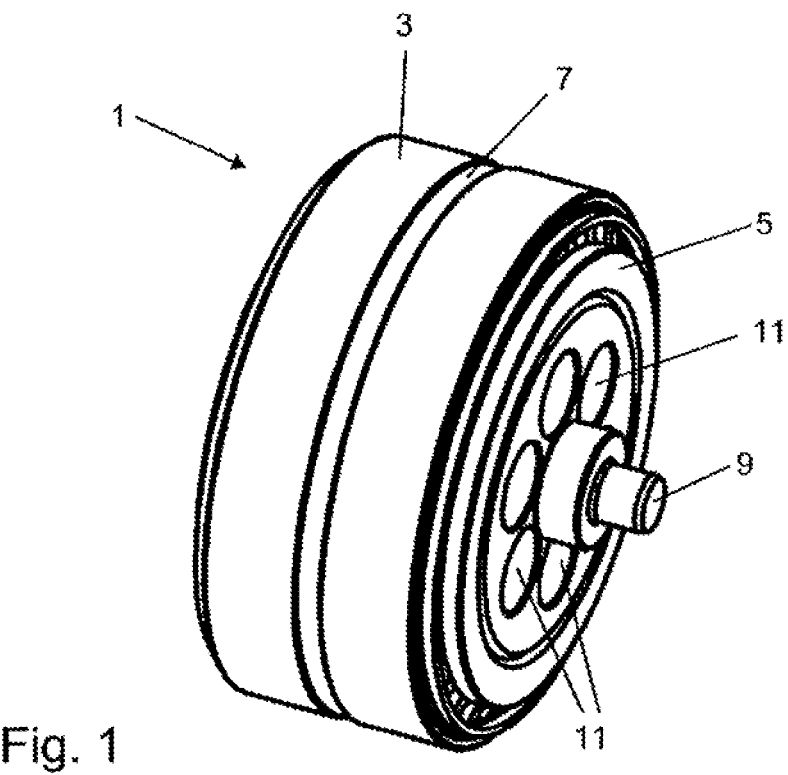
FIG. 1 shows a perspective view of a first exemplary embodiment.

In FIG. 1, a perspective view of a first representative tapered roller bearing assembly 1 is shown, which includes an outer ring 3 and a plurality of inner rings, of which only one inner ring 5 is shown due to the perspective illustration. A radially-encircling or circumferentially-extending groove 7 is defined in radially-outer surface of the outer ring 3. The outer ring 3 can be connected via this groove 7, e.g., with a complementary, not-illustrated toothed gear wheel, with a housing or another element that is desired to rotate during operation. This connection can take place, e.g., by inserting a securing ring into the groove 7, which securing ring engages in a corresponding groove within the toothed gear wheel, housing or other rotatable element.

A central bore (21—see FIG. 2) is formed within the inner rings 5 and a pin 9 is inserted into the central bore. The pin 9 serves to axially support the inner ring 5 shown in FIGS. 1 and 2 with a second inner ring not shown in FIGS. 1 and 2, as will be further explained below with the assistance of FIG. 3. A plurality of axially-extending bores 11 are defined within the inner ring 5 and are disposed so as to be spaced relative to the axial symmetry axis of the bearing assembly 1. The bores 11 preferably serve to receive carriage bolts, screws or similar attachment devices, by which the bearing assembly can be attached, e.g., to an engine or engine housing of a motor vehicle or to another type of bearing carrier/support.

Figure 2:
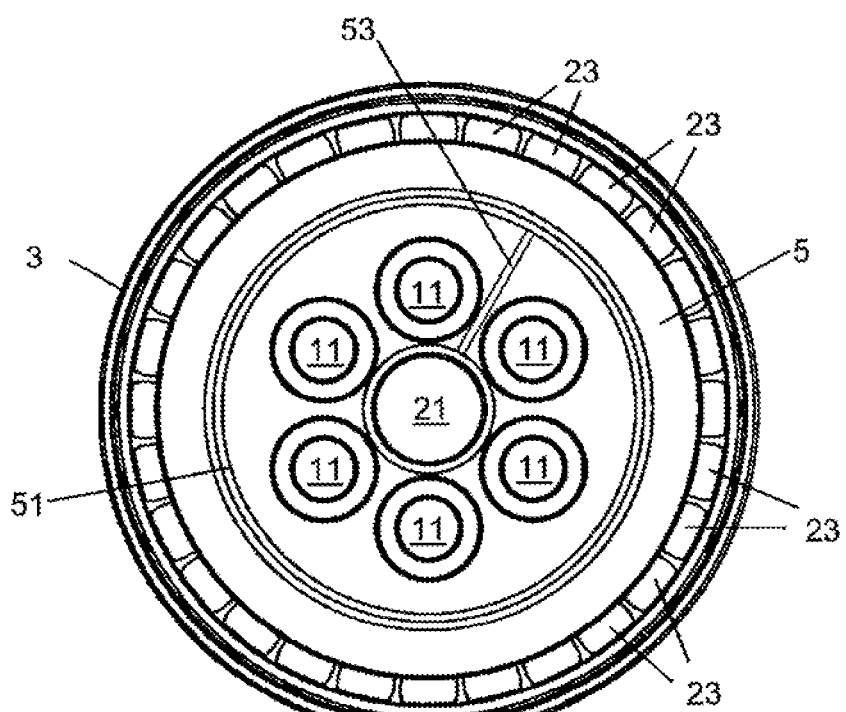
FIG. 2 shows an outer view of the exemplary embodiment of FIG. 1.

FIG. 2 shows a side view of the tapered roller bearing assembly 1 of FIG. 1. Again, the outer ring 3, one inner ring 5 and the central bore 21 can be recognized. The pin 9 from FIG. 1 is not inserted into the central bore 21 shown in FIG. 2 for clarity purposes, although it is understood that the pin 9 is normally disposed in central bore 21 during pre-installation and operation of the bearing assembly 1.

Although six attachment bores 11 are disposed around the central bore 21 of FIG. 2, it is understood that fewer (e.g., four, three or only two) or more (e.g., seven, eight, nine, etc.) bores can be provided. The attachment bores 11 may be disposed symmetrically or equidistantly relative to each other or may be arranged in other ways.

A plurality of tapered rollers 23 are rotatably disposed between the outer ring 3 and the inner ring 5 and serve to rotatably bear the outer ring 3 relative to the inner rings 5.

The inner ring 5 has a radially-encircling groove or channel 51, e.g., the groove or channel 51 is preferably circular or torus-shaped. This groove 51 is defined or disposed radially-outward from the attachment bores 11. A radially-extending groove or channel 53 is defined in or on the inner ring 5 and extends from the groove 51 to the central bore 21. In a preferred embodiment, the tapered roller bearing assembly 1 is mounted on an engine housing and lubricating oil from the engine is supplied to the groove 51. The lubrication oil can then be transported along the groove 51 to the groove 53, regardless of the position of the actual inflow of the oil into the groove 51, and thereby into the central bore 21. An axially-extending groove (not illustrated in FIG. 2) defined or disposed on a radially-inner surface of the central bore 21 connects to the groove 53. In this case, the lubricating oil can be transported between the inner rings 5a and 5b via this axially-extending groove. In the alternative, the groove 53 may be designed to feed into one (or more) of the bores 11 and in this case, the lubricant is communicated therein via a corresponding groove in an analogous manner. In another alternative, the groove 53 can be formed in another geometric shape, e.g., it can be spiral-shaped or otherwise curved.

Figure 3:
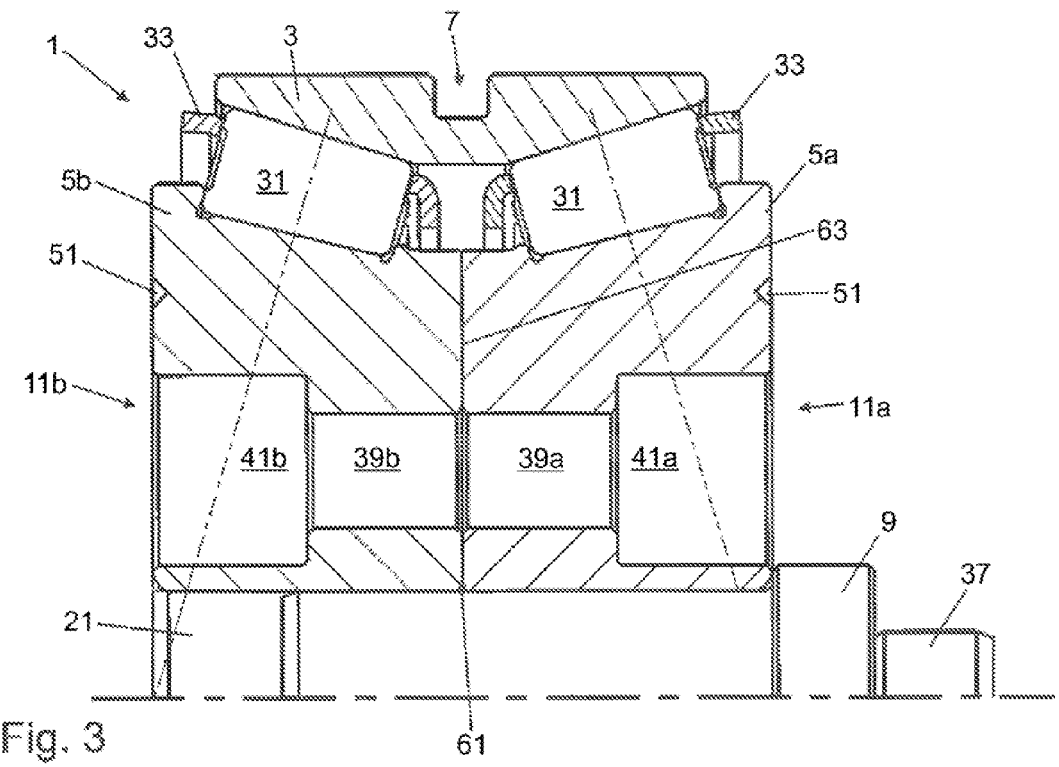
FIGS. 3 and 3a show two different cross-sectional illustrations of the exemplary embodiment of FIGS. 1 and 2.

FIG. 3 shows a cross-sectional illustration of the tapered roller bearing assembly of FIGS. 1 and 2 along the axial direction thereof from the center or axis of symmetry to the radially-outer edge of the bearing assembly 1.

This tapered roller bearing assembly 1 includes a one-piece outer ring 3 having the above-described groove 7 defined in an axially middle position of the outer ring 3. Two obliquely-extending track surfaces for tapered rollers 31 are formed or defined on the lower surface of the outer ring 3. The bearing assembly 1 includes two inner rings 5a and 5b, each of which also has a corresponding track surface for the tapered rollers 31. Thus, the embodiment of FIG. 3 is a two-row tapered roller bearing assembly 1 in the so-called O-arrangement with a one-piece outer ring 3 and a two-piece inner ring 5a and 5b. Each of the two tapered roller bearings comprises a set of tapered rollers 31 guided in respective cages 33.

Each of the inner rings 5a and 5b has a central bore 21. The pin 9 is disposed within the central bore 21 and may preferably perform at least two functions. For one, a press-fit between the outer surface of the pin 9 and the inner surface of the central bore 21 can be achieved by suitably dimensioning the pin 9 and the central bore 21 of the inner rings 5a and 5b. Due to the press-fit, e.g., ISO tolerance N6, of the pin 9 in the inner rings 5a and 5b, an axial pre-loading or tensioning or biasing of the inner rings 5a and 5b can be defined in a reliable manner. Thus, it is possible, in particular, to set or determine the amount of the pre-loading or pre-tensioning of the inner rings 5a, 5b in a well-defined manner already during the production or pre-installation of the bearing assembly 1. The pin 9 includes an end portion 37 having a reduced diameter outside of the intrinsic bearing assembly. A supplemental stabilizing and/or securing of the bearing assembly 1 can be achieved by inserting the end portion 37 of the pin 9, e.g., into an abutting locking washer or a supporting disk, thereby retaining it.

The inner rings 5a and 5b each have at least one attachment bore 11a and 11b, respectively. The bores 11a and 11b extend in the axial direction through the respective inner rings 5a, 5b. The inner rings 5a and 5b are arranged so that the bores 11a and 11b extend in a collinear manner. Each of the bores 11a and 11b has two portions 39a and 41a, 39b and 41b, respectively, of different diameters. In this case, for example, a not-illustrated carriage bolt can be inserted from the right into the bore 11a as shown in the illustration of FIG. 3. The carriage bolt goes through the portions 41a, 39a, 39b and 41b and, if it has sufficient length, its threaded end emerges again from the bore 11b. As a result, the entire tapered roller bearing assembly 1 can be attached, e.g., to an engine housing of a motor vehicle via the threads of the carriage bolt that axially project beyond the bore 11b. The head of the carriage bolt can be countersunk within the portion 41a of the inner ring 5 having the larger diameter, so that a compact mounted structure is achieved, thereby minimizing installation space requirements.

In such an embodiment, the portion 41b of the inner ring 5b having the larger diameter is not necessary for any particular functional purpose. However, the inner rings 5a and 5b are preferably constructed identically for manufacturing reasons, so that the required number of different components for the tapered roller bearing assembly 1 can be reduced. The assembly 1 as a whole is preferably mirror-symmetric from the outer ring 3 to the pin 9 relative to a plane extending in the radial direction between the inner rings 5a and 5b.

Figure 3A:
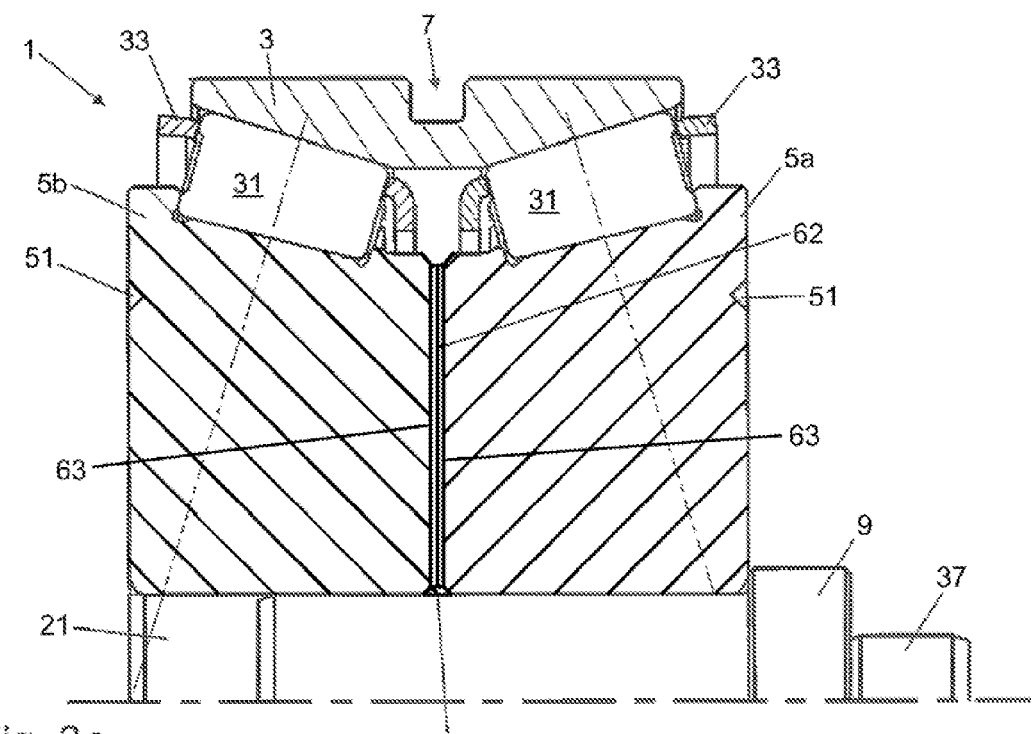

In this embodiment, each of the inner rings 5a and 5b has a chamfer 61 defined on a lower edge end adjacent to the central bore 21. The chamfer 61 preferably extends in a circumferential manner entirely around each of the inner rings 5a, 5b. FIG. 3a shows another groove or channel 62 that preferably extends in the radial direction from the chamfers 61 along each of the respective facing side surfaces 63 of the inner rings 5a and 5b and into the hollow chamber between the tapered roller bodies 31. In the alternative, such a groove or channel can also be formed only in or on one side surface 63 of the inner rings 5a or 5b. Such a groove ensures that lubricating oil, e.g., motor oil from the engine, reaches the roller bodies 31 during the operation and corresponds to a groove-like recess 127 of the next embodiment, as will be further discussed below.

As was already explained in connection with FIG. 2, the lubricating oil is received by the groove 51, is then transported via the groove 53 to the central bore 21 up to the chamfer 61 and then between the outer surfaces 63 of the inner rings 5a and 5b and finally to the tapered roller bearings 31. Another groove can be provided on or in the radially-inner surface of the central bore to assist in transporting the oil between the inner rings 5a, 5b, as was discussed above.

FIG. 4 shows a second representative tapered roller bearing assembly 101 that includes two tapered roller bearings, each having an outer ring 103, an inner ring 105, a plurality of roller bodies 107 and a cage 109 for retaining the roller bodies 107. The outer rings 103 are fitted into corresponding mating surfaces of a toothed gear wheel 111. The inner rings 105 each have a central bore and a centering element 113 is inserted in the central bore. Due to the centering element 113, the inner rings 105 can be pre-installed in a pre-loaded manner with a press-fit in a manner analogous to the pin 9 of the exemplary embodiment of FIGS. 1 to 3.

The inner rings 105 also have attachment bores 115 lying outside of the axial symmetry axis, which bores 115 are disposed in a manner analogous to the bores 11 of the embodiment of FIGS. 1 to 3. Attachment screws or bolts 117 may be inserted into the bores 115.

Further, the centering element 113 has a first hollow space 118 that is separated from a second hollow space 121 by a separating wall 119. The separating wall 119 has a radially-encircling or circumferentially-extending recess or channel 123 and at least one bore 125 extending radially outward from the recess 123. The function of the bore 125 will be explained with the assistance of FIG. 5.

In FIG. 5, the tapered roller bearing assembly 101 of FIG. 4 is shown in a cross-sectional illustration from another angular position, i.e. the assembly 101 has been rotated about its central axis relative to the illustration of FIG. 4 so that the cross-section does not extend through the bore 115 and the attachment screw 117, but rather extends through the part of the inner rings 105 that lies between two screws 117. Thus, in FIG. 5, the bore 125 lies in the plane of the cross-sectional illustration.

It is also illustrated here that the inner rings 105 each have a groove-like recess or channel 127 defined on the outer side surfaces that face each other in the axial direction. At least one of the recesses 127 is designed such that the bore 125 is connected or in communication with the recess 127. Consequently, the hollow space between the tapered rollers 107 is connected or in communication with the hollow space 118 of the centering element 113 via the recesses 127 and the bore 125. Lubricating oil from the engine compartment can flow into the hollow space 118 and then can be transported via the bore 125 and the recess(es) 127 to the tapered rollers 107, thereby ensuring an adequate or satisfactory lubrication of the tapered roller bearing assembly 101 during operation.

In the alternative, instead of the recess(es) or channel(s) 127 defined on the inner rings 105, it is possible to provide a chamfer and a spiral-shaped-extending groove in a manner analogous to the exemplary embodiment of FIG. 3. If the chamfer is provided, it is not necessary for the bore 125 to lie directly at the starting point of the spiral-shaped groove. If the chamfer radially encircles or circumferentially extends around the entire inner ring 105, the bore 125 is always connected or in communication with the spiral-shaped-extending groove, thereby ensuring an unhindered flow of lubricating oil from the hollow space 118 to the tapered rollers 107. The sole prerequisite therefor is that the bore 125 lies precisely between the inner rings 105 with reference to the axial direction.

In contrast to the embodiment of FIG. 3, the attachment bore 115 and the screw head of the screw 117 of this embodiment are preferably dimensioned to prevent an axial migration of the centering element 113 in the direction of the screw head. This is ensured by designing the screw head so that it radially overlaps the centering element 113, thereby bounding or limiting the axial movement of the centering element 113. That is, the screw head acts as an axial stop for the centering element 113.

Figure 6:
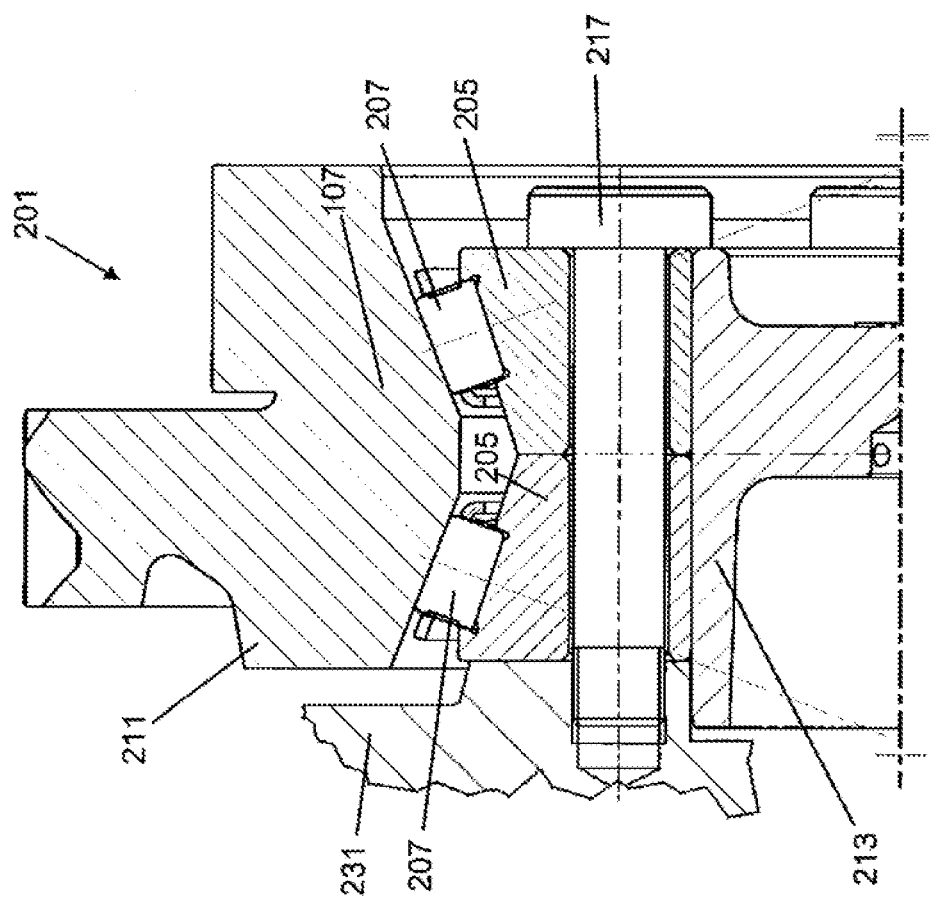
FIG. 6 shows a cross-sectional illustration of a third exemplary embodiment.

A further embodiment of the invention is illustrated in FIG. 6, which is substantially the same as the exemplary embodiment of FIGS. 4 and 5 with the difference that separate or discrete outer rings are not present. Instead, the track surfaces for the tapered rollers 207 are directly machined into the lower surface of the toothed gear wheel 211. The number of the necessary components is thus further reduced as compared to the embodiment of FIGS. 4 and 5.

In FIG. 6, it can also be recognized, in an exemplary manner, how the bearing assembly 201 may be attached to the engine housing 231 by a screw 217. The screw 217 goes through the two inner rings 205 in the axially-extending bores provided therefor and engages in a corresponding thread in the engine housing 231.

In the illustration of FIG. 6, the function of the centering unit 213 is also further demonstrated. The centering unit 213 projects in the axial direction beyond the inner ring 205 that directly borders the engine housing 231. Thus, the centering unit 213 mates or engages in a corresponding or complementary recess in the engine housing 231 and thus ensures a perfectly-fitted centering of the bearing assembly 201 on the engine housing 231. An axial migration or shifting of the centering element 213 during operation is thus effectively prevented on the one side by the engine housing 231 and on the other side by the screw head of the screw 217.

In the embodiment of FIGS. 1 to 3, a suitably axially-elongated pin 9 can perform the function of preventing axial migration or shifting.

Figure 7:
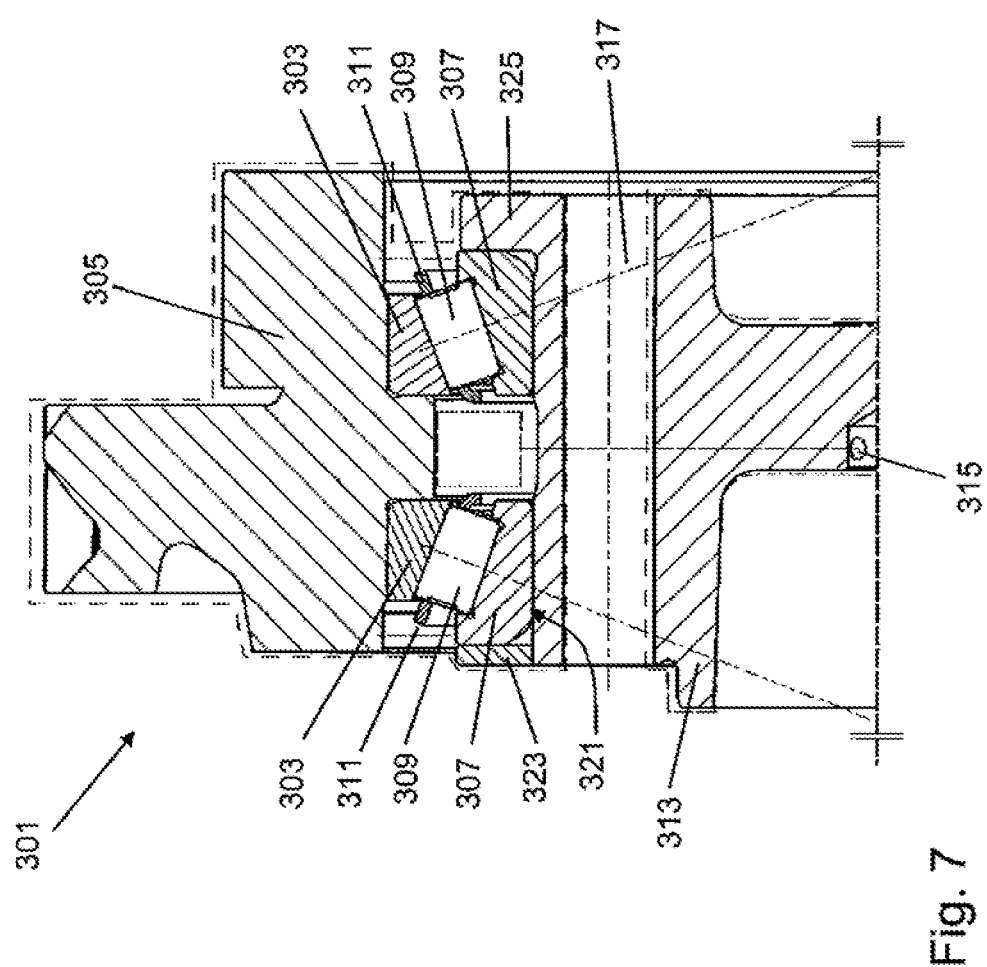
FIG. 7 shows a cross-sectional illustration of a fourth exemplary embodiment.

In FIG. 7, a fourth representative tapered roller bearing assembly 301 includes outer rings 303 in a manner analogous to the exemplary embodiments of FIGS. 4 and 5. The outer rings 303 are fitted into complementary mating surfaces of a toothed gear wheel 305. The tapered roller bearing assembly 301 further includes two inner rings 307 that are rotatably disposed on the outer rings 303 via two sets of tapered rollers 309. The tapered rollers 309 are each guided in respective cages 311. A centering element 313 serves to center the tapered roller bearing assembly 301 in a not-illustrated housing in a manner analogous to the exemplary embodiments of FIGS. 4 to 6. It also has a radially-extending bore 315, via which lubricant can be guided to the space between the tapered rollers 309.

In contrast to the exemplary embodiments of FIGS. 4 to 6, the attachment bores 317 are defined in the centering element 313 so as to be spaced in the radial direction from the axial symmetry axis. The attachment bores 317 are again adapted or designed to receive, e.g., attachment screws or carriage bolts. Thus, the tapered roller bearing assembly 301 can be attached to a housing or a bearing carrier by the screws or bolts extending through the centering element 313, rather than through attachment bores defined in the inner rings 307 as in the previous embodiments.

The inner rings 307 are disposed on a seating surface 321 so as to be spaced in the axial direction by a spacer element 319 disposed between them. Further, a tensioning ring 323 is provided that is also disposed on the seating surface 321. The centering element 321 includes a flange-like extension 325 that extends radially outward such that it engages behind one of the inner rings 307. When the screws are now inserted into the bores 317 and thus the tensioning disk is supported on a corresponding housing, a well-defined axial pre-loading or pre-tensioning of the two inner rings 307 can be achieved by the cooperation of the tensioning disk and a defined clamping torque of the screw. The axial pre-loading or axial clamping of the inner rings 307 is necessary for the operation of the tapered roller bearing assembly 301 in a manner similar to the previous embodiments.

Although many of the lubrication conduits have been depicted as grooves (e.g., 51, 53, 127, etc.) that are open to the surface, such lubrication conduits can be embodied as channels or bores that are completely defined within the inner rings, such that the lubricant is transported through the inner ring(s) rather than on an outer surface of the inner ring(s).

REFERENCE NUMBER LIST

1 Tapered roller bearing assembly
3 Outer ring
5, 5a, 5b Inner ring
7 Radially-encircling groove
9 Pin
11, 11a, 11b Bore
21 Central bore
23 Tapered roller
31 Tapered roller
33 Cage
37 Portion of pin 9 having a reduced diameter
39a, 39b Portion of bores 11a and 11b, respectively, having a smaller diameter
41a, 41b Portion of bores 11a and 11b, respectively, having a larger diameter
51 Groove
53 Groove
61 Chamfer
63 Outer side surface of inner rings 5a, 5b
101 Tapered roller bearing assembly
103 Outer ring
105 Inner ring
107 Tapered roller
109 Cage
111 Toothed gear wheel
113 Centering element
115 Bore
117 Attachment screw
118 Hollow interior
119 Separating wall
121 Hollow interior
123 Recess
125 Bore
127 Recess
201 Tapered roller bearing assembly
205 Inner ring
207 Tapered roller
211 Toothed gear wheel
213 Centering element
217 Screw
231 Engine housing
301 Tapered roller bearing assembly
303 Outer ring
305 Toothed gear wheel
307 Inner ring
309 Tapered roller
311 Cage
313 Centering element
315 Bore
317 Screw
319 Spacer element
321 Seating surface
323 Tensioning ring
325 Extension

The invention claimed is:

1. A bearing assembly comprising:
   at least one outer ring;
   an inner ring unit including a first inner ring and a second inner ring, the inner ring unit having a central, axial bore extending through the first inner ring and the second inner ring, and a plurality of attachment bores for attaching the bearing assembly to a bearing carrier, the plurality of attachment bores being spaced radially outward of the central axial bore and located away from an axis of symmetry of the bearing assembly;
   a first plurality of roller bodies rotatably disposed between the at least one outer ring and the first inner ring and a second plurality of roller bodies disposed between the at least one outer ring and the second inner ring; and a pin extending through the central axial bore of the first inner ring and through the central axial bore of the second inner ring, the pin maintaining a predetermined preload on the bearing assembly by holding the first inner ring in a fixed position relative to the second inner ring, the pin is press fit in the central axial bore of the first inner ring and in the central axial bore of the second inner ring, and a chamfer on a radially-inward edge of at least one of the first inner ring and the second inner ring, at least one groove on an outer surface of the first inner ring on a side of the first inner ring facing the second inner ring, the at least one groove extending radially outward from the chamfer and being configured to transport lubricant radially outwardly from the chamfer.

2. The bearing assembly according to claim 1, wherein the first and second plurality of roller bodies are tapered roller bodies and wherein the central axial bore of the first inner ring and the central axial bore of the second inner ring are coaxial.

3. The bearing assembly according to claim 1, wherein the groove is spiral-shaped.

4. The bearing assembly according to claim 1, wherein the pin has an at least partially hollow interior and a radially-extending bore, the bore being configured to transport lubricant from the at least partially hollow interior to the at least one chamfer.

5. The bearing assembly according to claim 4, including a circular groove on or in the first inner ring at an outer side surface of the first inner ring that faces away from the second inner ring, and a radial groove extending from the circular groove to an inner edge of the first inner ring.

6. An apparatus comprising:
a bearing carrier; and
a bearing assembly comprising:
at least one outer ring;
an inner ring unit including a first inner ring and a second inner ring, the inner ring unit having a central, axial bore extending through the first inner ring and the second inner ring, and a plurality of attachment bores for attaching the bearing assembly to a bearing carrier, the plurality of attachment bores being spaced radially outward of the central axial bore and located away from an axis of symmetry of the bearing assembly;
a first plurality of roller bodies rotatably disposed between the at least one outer ring and the first inner ring and a second plurality of roller bodies disposed between the at least one outer ring and the second inner ring; and
a pin extending through the central axial bore of the first inner ring and through the central axial bore of the second inner ring, the pin maintaining a predetermined preload on the bearing assembly by holding the first inner ring in a fixed position relative to the second inner ring, and
the apparatus further comprising a plurality of attachment devices extending through each of the plurality of attachment bores and into the bearing carrier and securing the bearing assembly to the bearing carrier,
wherein the plurality of attachment devices have threaded ends that threadably engage threaded openings in the bearing carrier, and
wherein the first inner ring includes an inner face and an outer face and the second inner ring includes an inner face facing the inner face of the first inner ring and an outer face, and
wherein each of the attachment bores has an end portion at the first inner ring outer face having a diameter greater than a diameter of a second portion of the attachment bores at a location between the first inner ring inner face and the first inner ring outer face, and
wherein each of the attachment devices includes a head disposed in the end portion.

7. The apparatus according to claim 6, wherein the bearing carrier is one of an engine and an engine housing of a motor vehicle.

8. The apparatus according to claim 6, further comprising gear teeth disposed on a radially-outer portion of the bearing assembly.

9. The apparatus according to claim 6, wherein the plurality of attachment devices have threaded ends that threadably engage threaded openings in the bearing carrier, and
wherein the first inner ring includes an inner face and an outer face and the second inner ring includes an inner face facing the inner face of the first inner ring and an outer face, and
wherein each of the attachment devices includes a head overlying a portion of the first inner ring outer face and overlying a portion of the pin.

10. A bearing assembly comprising:
at least one outer ring,
an inner ring unit including a first inner ring having a central, axial bore and a second inner ring having a central, axial bore,
a first plurality of roller bodies rotatably disposed between the at least one outer ring and the first inner ring and a second plurality of roller bodies rotatably disposed between the at least one outer ring and the second inner ring,
a pin extending through the central axial bore of the first inner ring and through the central axial bore of the second inner ring and forming a friction fit with the central axial bore of the first inner ring and the central axial bore of the second inner ring and maintaining a predetermined preload on the bearing assembly, and
a plurality axial attachment bores located radially outwardly of the central axial bore of the first inner ring, each of the plurality of axial attachment bores being configured to receive at least one attachment device for fixing the bearing assembly to a bearing carrier,
wherein at least a portion of the first inner ring and a portion of the second inner ring are located in a central opening of the at least one outer ring, and
a circular groove located radially outward of the attachment bores formed on or in the first inner ring at an outer side surface of the first inner ring that faces away from the second inner ring, and a radial groove extending from the circular groove to an inner edge of the first inner ring.

11. The bearing assembly according to claim 10, wherein the at least one attachment device comprises a plurality of attachment devices, and wherein each of the plurality of attachment devices extends through one of the plurality of axial attachment bores.

12. The bearing assembly according to claim 10, wherein the axial attachment bores are located in the pin.

13. The bearing assembly according to claim 10, wherein the roller bodies are tapered roller bodies.

14. The bearing assembly according to claim 10, wherein the first inner ring and the second inner ring are identical.

15. The bearing assembly according to claim 10, wherein the portion of the first inner ring is in direct contact with the portion of the second inner ring.

16. The bearing assembly according to claim 10,
wherein the first inner ring has an inner face lying in a plane and the second inner ring has an inner face facing the first inner ring inner face,
wherein the plane intersects the outer ring, and
wherein the first plurality of rollers are located entirely on a first side of the plane and the second plurality of rollers are located entirely on a second side of the plane.

17. An apparatus comprising the bearing assembly according to claim 10 attached to the bearing carrier by the at least one attachment device.

\* \* \* \* \*